(12) United States Patent
Buchholz et al.

(10) Patent No.: US 10,837,500 B2
(45) Date of Patent: Nov. 17, 2020

(54) FLUID FRICTION CLUTCH

(71) Applicant: BorgWarner Ludwigsburg GmbH, Ludwigsburg (DE)

(72) Inventors: Thomas Buchholz, Stockach (DE); Wolfgang U. Sorg, Horgenzell (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 135 days.

(21) Appl. No.: 16/135,565

(22) Filed: Sep. 19, 2018

(65) Prior Publication Data

US 2019/0085912 A1 Mar. 21, 2019

(30) Foreign Application Priority Data

Sep. 21, 2017 (DE) .................. 10 2017 216 696

(51) Int. Cl.
*F16D 48/02* (2006.01)
*F16D 31/06* (2006.01)
*F16D 35/02* (2006.01)

(52) U.S. Cl.
CPC ............ *F16D 25/14* (2013.01); *F16D 31/06* (2013.01); *F16D 35/024* (2013.01); *F16D 2300/14* (2013.01)

(58) Field of Classification Search
CPC .................................................. F16D 35/024
See application file for complete search history.

(56) References Cited

U.S. PATENT DOCUMENTS

| | | | |
|---|---|---|---|
| 3,458,020 A | 7/1969 | Lutz | |
| 4,351,425 A * | 9/1982 | Bopp | F16D 35/026 |
| | | | 123/41.12 |
| 5,992,594 A * | 11/1999 | Herrle | F16D 35/024 |
| | | | 192/58.61 |
| 2008/0257677 A1 | 10/2008 | Schultheiss et al. | |
| 2009/0127051 A1 | 5/2009 | Buchholz | |
| 2010/0059325 A1* | 3/2010 | Boyer | F16D 35/024 |
| | | | 192/58.61 |
| 2015/0144452 A1 | 5/2015 | Buchholz et al. | |
| 2015/0337909 A1 | 11/2015 | Raiser et al. | |
| 2016/0208867 A1* | 7/2016 | Sorg | F16D 35/024 |
| 2017/0335901 A1 | 11/2017 | Buchholz et al. | |

FOREIGN PATENT DOCUMENTS

| | | |
|---|---|---|
| DE | 1 575 972 A1 | 2/1970 |
| DE | 10 2007 019 088 A1 | 10/2008 |
| DE | 10 2015 203 064 A1 | 8/2016 |
| DE | 10 2015 205 340 A1 | 10/2016 |
| EP | 1 731 787 B1 | 8/2008 |
| EP | 2 679 849 A1 | 1/2014 |
| JP | S 62-224734 A | 10/1987 |

* cited by examiner

*Primary Examiner* — Mark A Manley
(74) *Attorney, Agent, or Firm* — Bose McKinney and Evans LLP

(57) ABSTRACT

This disclosure relates to a fluid friction clutch having a housing, a clutch disc which is arranged at one end of a shaft which is mounted within the housing, a working chamber which is configured between the housing and the clutch disc, a storage chamber for clutch fluid, and at least one feed duct which leads from the storage chamber to the working chamber. Moreover, a pressure relief device for discharging clutch fluid from the feed duct into the storage chamber is provided.

17 Claims, 10 Drawing Sheets

FLUID FRICTION CLUTCH

RELATED APPLICATIONS

This application claims priority to DE 10 2017 216 696.7, filed Sep. 21, 2017, the disclosure of which is hereby incorporated by reference in its entirety.

BACKGROUND

This disclosure relates to a fluid friction clutch.

Known fluid friction clutches have a housing and a clutch disc which is arranged such that it can be rotated with respect to the housing and is arranged fixedly at one end of a shaft which is mounted centrally within the housing so as to rotate with the said shaft. A working chamber which can be loaded with clutch fluid is configured between the housing and the clutch disc. Moreover, the housing comprises a storage chamber for the clutch fluid, a feed duct which leads from the storage chamber to the working chamber, and a return line for the clutch fluid from the working chamber to the storage chamber. A valve arrangement for controlling the clutch fluid which is fed to the working chamber is arranged in the feed duct. A fluid friction clutch of this type is generally described in U.S. Publication No. 2009/0127051 A1.

SUMMARY

This disclosure teaches an efficient fluid friction clutch.

In particular, the fluid friction clutch according to this disclosure contributes to auxiliary units which are driven via the fluid friction clutch having as little influence as possible on the fuel consumption when they are not required, that is to say the fluid friction clutch is in idling operation.

The fluid friction clutch according to this disclosure comprises a housing, a clutch disc which is arranged at one end of a shaft which is mounted within the housing, a working chamber which is configured between the housing and the clutch disc, a storage chamber for clutch fluid, and at least one feed duct which leads from the storage chamber to the working chamber. Furthermore, the fluid friction clutch has a pressure relief device for discharging clutch fluid from the feed duct into the storage chamber. The pressure relief device makes a rapid dissipation of the delivery pressure of the clutch fluid in the direction of the working chamber possible. Via this, in particular, the idling rotational speed of the fluid friction clutch can be regulated. Moreover, the clutch fluid can be conducted directly from the feed duct back into the storage chamber via the pressure relief device in the case of a switched-off clutch (open clutch), without first of all passing into the working chamber. This leads to a higher efficiency of the fluid friction clutch, since fewer shear forces occur in the working chamber.

In refinements of this disclosure (hereinafter referred to as "refinements"), the storage chamber can be divided into a filling chamber and a retaining chamber. By way of the division of the storage chamber into a filling chamber and a retaining chamber, it is possible to set a targeted filling quantity distribution between the filling chamber and the retaining chamber. Here, the filling quantity in the filling chamber is set to be lower than in the retaining chamber, as a result of which the drag torque of the fluid friction clutch can be kept low in the open state of the fluid friction clutch, since the pump element circulates in the small filling quantity in the filling chamber. This reduces the idling rotational speed of the fluid friction clutch and therefore its losses (friction, drag torque), as a result of which the efficiency of the fluid friction clutch is increased and, via this, the fuel consumption is reduced.

Moreover, this disclosure comprises a fluid friction clutch having a housing of a clutch disc which is arranged at one end of a shaft which is mounted within the housing, a working chamber which is configured between the housing and the clutch disc, a storage chamber for clutch fluid, and at least one feed duct which leads from the storage chamber to the working chamber. The storage chamber is divided into a filling chamber and a retaining chamber. For this refinement of the fluid friction clutch, the advantages which have already been described in the preceding text result from the division of the storage chamber into a filling chamber and a retaining chamber.

In refinements, a pressure relief device for discharging clutch fluid from the feed duct into the storage chamber can be provided.

In refinements which can be combined with all refinements of the fluid friction clutch which have been described up to now, the pressure relief device can comprise at least one pressure relief opening in the clutch disc in the region of the feed duct, and a valve having a closing device for closing the pressure relief opening. Moreover, the clutch disc can have at least one outlet opening in the region of a radial end of the working chamber, the closing device being designed to also close the outlet opening. At least in each case two feed ducts, two pressure relief openings and two outlet openings can also be provided, which are arranged in each case diametrically with respect to one another. The closing device can then be designed to close both pressure relief openings and both outlet openings.

In refinements, the valve can be designed to close the pressure relief opening/openings and the outlet opening/openings of the working chamber by way of a single closing movement of the closing device in order to fill the working chamber. The valve can also be designed to open the pressure relief opening/openings and the outlet opening/openings of the working chamber by way of a single opening movement of the closing device which is in the opposite direction to the closing movement, in order to empty the working chamber. The working chamber can be emptied very rapidly as a result of the combination of outlet opening/openings and pressure relief opening/openings which can be opened and closed via a single valve. This leads to reduced losses and therefore to an increase in the efficiency of the fluid friction clutch. Moreover, the integral valve for opening and closing both the pressure relief opening/openings and the outlet opening/openings affords a simple way of regulating the fluid friction clutch efficiently without increasing the complexity of the fluid friction clutch, since a plurality of valves do not have to be provided.

In refinements, the closing device can be prestressed into a closed switching position of the pressure relief opening/openings and the outlet opening/openings. The prestress can be brought about by way of at least one restoring spring. In particular, the restoring spring can act in the axial direction. As an alternative, the restoring spring can be a torsion spring.

In refinements, the valve can be designed to rotate the closing device. The closing device can have a rotatably mounted closing ring with closing lugs which extend radially to the outside from the closing ring for closing the pressure relief opening/openings and the outlet opening/openings. Moreover, the valve can have an electromagnet which is designed to rotate the closing ring in order to open the pressure relief opening/openings and the outlet opening/openings.

As an alternative to the rotational movement, the valve can be designed to move the closing device in a translational manner in the axial direction. The closing device can comprise an axially displaceable closing ring, the closing ring being designed to close both the pressure relief opening/openings and the outlet opening/openings in a closed position. Moreover, the valve can have an electromagnet which is designed to displace the closing ring axially in order to open the pressure relief opening/openings and the outlet opening/openings.

In refinements which can be combined with all refinements which have been described up to now, moreover, a valve pin can be provided which is designed to reduce the throughflow of clutch fluid through the feed duct in a closed position, in order to minimize a feed of clutch fluid into the working space. The valve pin can be part of the closing device. The valve can be designed to move the valve pin into the closed position at the same time as the opening movement for opening the pressure relief opening and the outlet opening.

In refinements which can be combined with all refinements which have been described up to now, the clutch disc can have at least one pump element which protrudes into the storage chamber in a radially outer region, the pump element defining a shear gap with the housing, with the result that, in the case of a rotation of the clutch disc relative to the housing, a pumping action is produced which conveys clutch fluid from the storage chamber through the feed duct radially to the inside. By way of the provision of the pump element which forms a shear gap with the housing, the differential rotational speed between the clutch disc and the housing is utilized in a simple way, as a result of which a volumetric flow of clutch fluid which is dependent on the differential rotational speed is generated from the storage chamber into the working chamber. The pump effect which is generated by the pump element leads to a rapid response behaviour.

A further advantage is that only a small quantity of clutch fluid is required on account of the arrangement of the pump element in the storage chamber, since the pump element removes the clutch fluid efficiently at the radially outer edge of the storage chamber. On account of the centrifugal forces which are present, the said region is always filled with clutch fluid, even if there is a small amount of clutch fluid in the storage chamber. Moreover, a small degree of filling of the storage chamber contributes to lower friction losses, as a result of which the efficiency of the clutch is increased further.

In refinements which can be combined with all refinements which have been described up to now, the storage chamber can be arranged so as to lie radially on the outside, with the result that the storage chamber is arranged outside an outer face of the clutch disc.

In refinements which can be combined with all refinements which have been described up to now, an annular retaining panel can be provided which is arranged in the storage chamber and divides the storage chamber into the filling chamber and the retaining chamber. The retaining panel can have one or more openings, for throughflow of clutch fluid between the retaining chamber and the filling chamber. The opening/openings regulates/regulate the throughflow rate of clutch fluid from the retaining chamber into the filling chamber, and therefore the degree of filling in the filling chamber. Consequently, the idling rotational speed of the fluid friction clutch can in turn be set. The one or more openings can provide a flow resistance, via which the idling rotational speed of the clutch disc can be set. The retaining panel can have a stepped cross-sectional profile. The housing can have a housing body and a housing cover, and the retaining panel can be clamped fixedly between the housing cover and the housing body. An arrangement of this type has the advantages of simple assembly and division of the storage chamber into a filling chamber and a retaining chamber.

Furthermore, the advantage arises for the above-described refinements of the fluid friction clutch according to this disclosure that they are suitable for every type of auxiliary assembly. If, for example, the auxiliary assembly is a pump, the drive member of which is the pump impeller, the latter is mounted on the shaft and therefore rotates at a secondary rotational speed. If the auxiliary assembly is a fan, the fan impeller is fixed on the housing which then in this case represents that component which runs at the secondary rotational speed.

Further details and features of this disclosure will be described in the following text using the figures.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

It shall be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "feed duct," "opening," "chamber," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

In the following text, exemplary embodiments for the fluid friction clutch 1 according to this disclosure will be described using the figures. Within the context of this application, radial faces/planes relate to faces/planes which are arranged substantially orthogonally with respect to the rotational axis R of the fluid friction clutch 1.

Figure 1A:
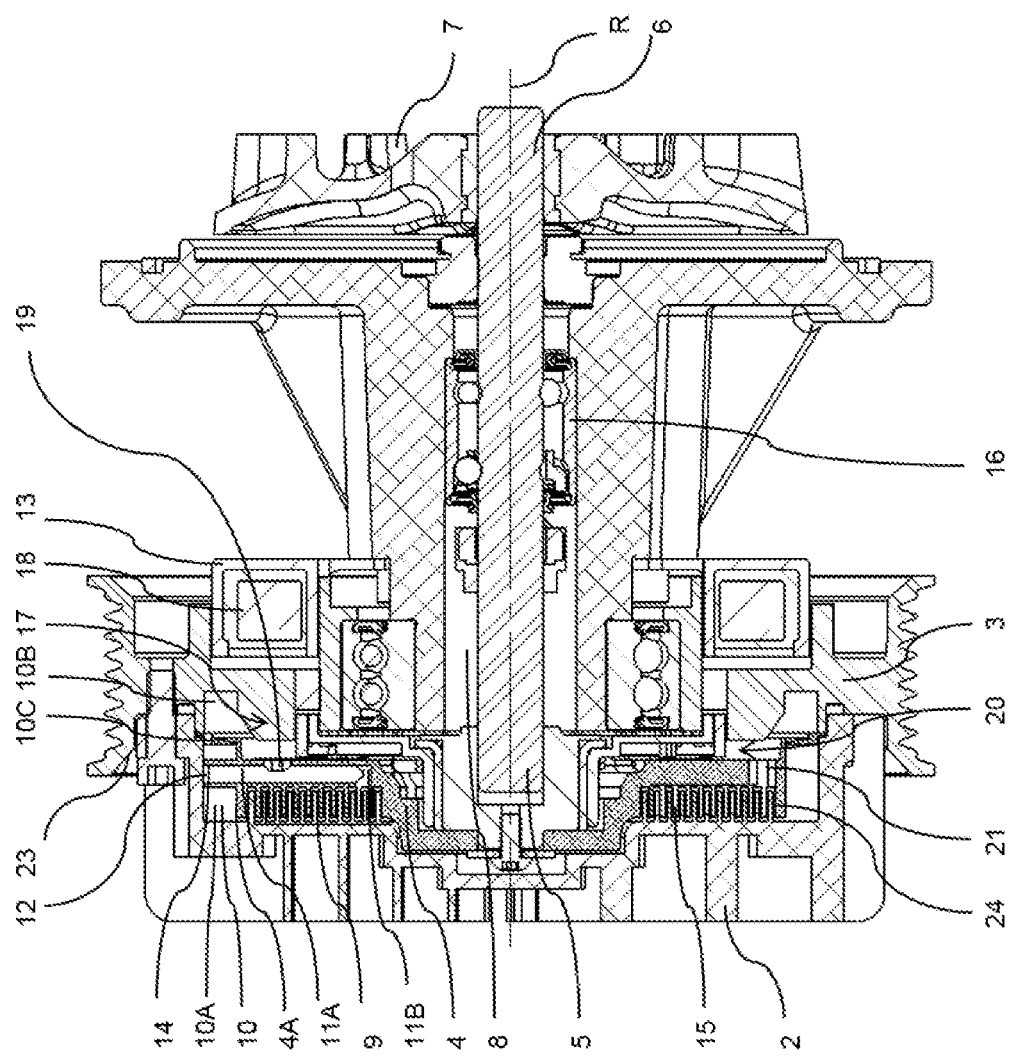
FIG. 1A shows a sectional illustration of a first exemplary embodiment of the fluid friction clutch according to this disclosure.
Figure 1B:
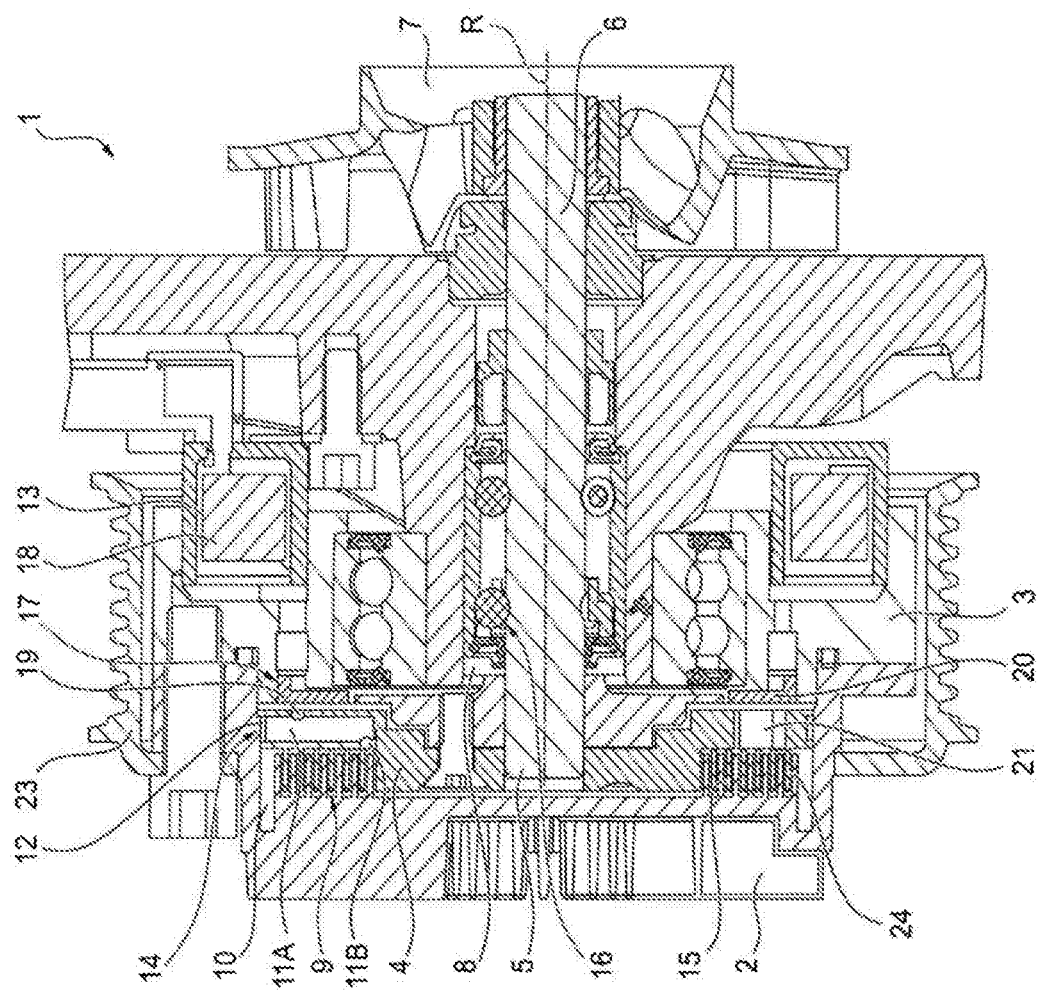
FIG. 1B shows a sectional illustration of a second exemplary embodiment of the fluid friction clutch according to this disclosure.
Figure 1C:
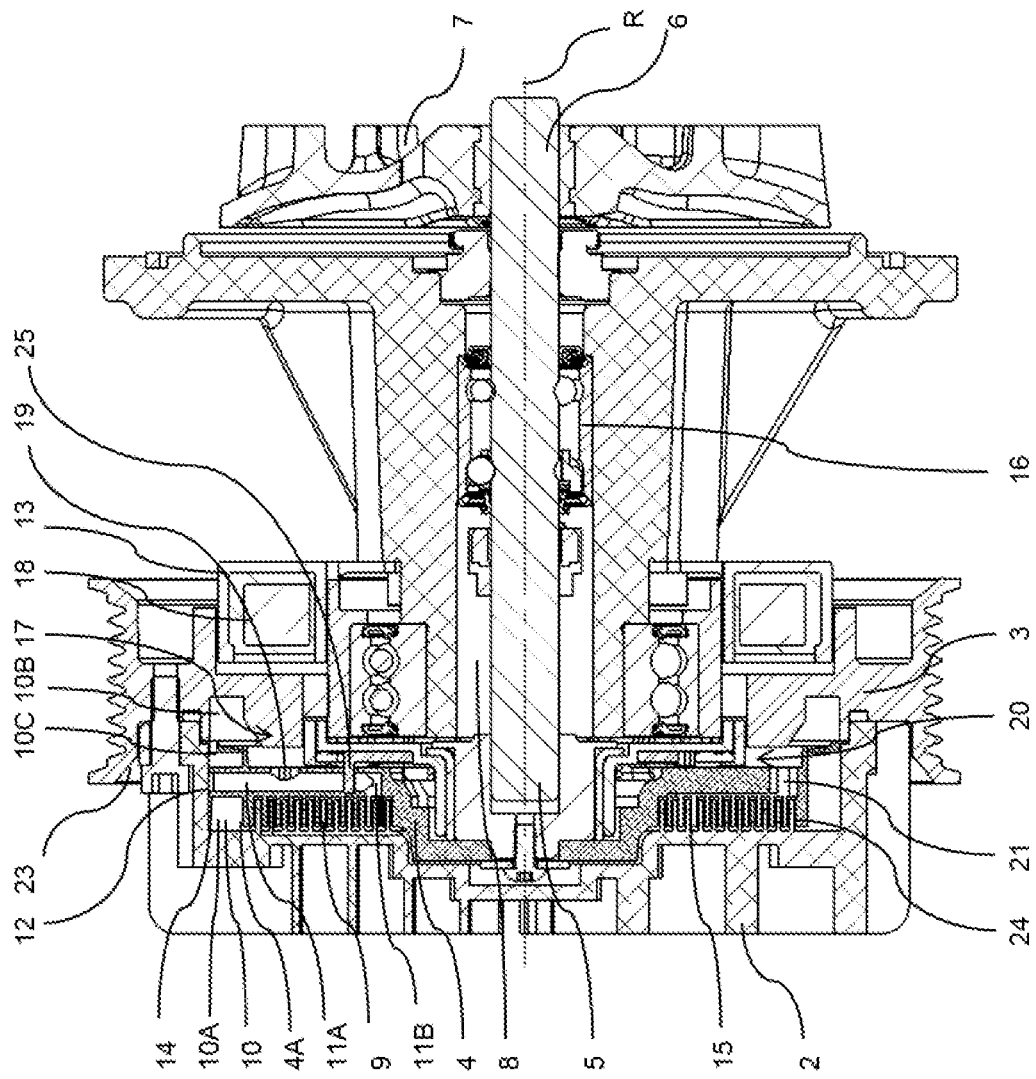
FIG. 1C shows a sectional illustration of a third exemplary embodiment of the fluid friction clutch according to this disclosure.

FIG. 1A, FIG. 1B and FIG. 1C show sectional illustrations of three exemplary embodiments of the fluid friction clutch 1 according to this disclosure which has a rotational axis R. In the following text, the common components of the three depicted exemplary embodiments will first of all be described, before the differences are then described in greater detail. Identical components are provided with identical reference numerals in all the figures.

The fluid friction clutch 1 according to this disclosure comprises a housing 2, 3, the housing being divided into a housing body 3 and a housing cover 2 in the exemplary embodiments which are shown in FIG. 1A to FIG. 1C. In the case of the embodiments which are shown in FIG. 1A to FIG. 1C, the housing cover 2 is connected to a pulley wheel 23, which represents merely one option. The pulley wheel 23 can also be replaced by other transmission elements. The pulley wheel 23 and the housing cover 2 can be configured in one piece or else in two pieces. A clutch disc 4 is arranged fixedly on one end 5 of a shaft 6 so as to rotate with it. The shaft 6 extends through a receiving space 8 within the housing 2, 3 and is then mounted rotatably therein via a bearing 16. At the other end of the shaft 6, an active member 7 is coupled to the shaft 6. The active member 7 can be coupled, for example, to the driven components of a pump. Furthermore, the fluid friction clutch 1 has a working chamber 9 which is configured between the housing 2, 3 and the clutch disc 4. The working chamber 9 has working gaps 15 which, on account of a shear action on the clutch fluid which is fed to the working chamber, make a transmission of torque possible between the housing 2, 3 and the clutch disc 4.

Moreover, a storage chamber 10 for clutch fluid is provided in the housing 2, 3, at least one feed duct 11A, 11B leading from the storage chamber 10 to the working chamber 9, in order to provide clutch fluid in the working chamber 9. As can be gathered from FIG. 1A to FIG. 1C, the feed duct 11A, 11B is arranged within the clutch disc 4. The storage chamber 10 is arranged radially on the outside, with the result that the storage chamber 10 is positioned radially outside the working chamber 9 and radially outside an outer face 4A of the clutch disc 4.

In a radially outer region, the clutch disc 4 has at least one pump element (also referred to herein as "pump") 14 which protrudes into the storage chamber 10 and rotates relative to the housing 2, 3. The exemplary embodiments which are shown have in each case two pump elements 14 which extend from the outer face 4A of the clutch disc (see also, for example, FIG. 6). The pump element 14 defines a shear gap 12 with the housing 2, 3, with the result that, in the case of a rotation of the clutch disc 4 relative to the housing 2, 3, a pumping action is produced which conveys clutch fluid from the storage chamber 10 through the feed duct 11A, 11B radially to the inside in the direction of a radially inner inlet into the working chamber 9. That is to say, in the case of a corresponding switching state of the fluid friction clutch 1, the clutch fluid is conveyed from the storage chamber 10 through the feed duct 11A, 11B into the working chamber 9 in order to fill the working chamber 9. The shear gap 12 can be between 50 μm and 200 μm, in particular between 100 μm and 1000 μm, preferably between 200 μm and 800 μm in size. The pump element 14 has an inlet duct 14A which runs along the circumference of the pump element 14 and opens into the radially extending feed duct 11A, 11B. The differential rotational speed between the clutch disc 14 and the housing 2, 3 is utilized in a simple way as a result of the provision of the pump element 14 which forms a shear gap 12 with the housing, as a result of which a volumetric flow of clutch fluid which is dependent on the differential rotational speed is generated from the storage chamber 10 into the working chamber 9. The pump effect which is generated by the pump element 14 leads to a rapid response behaviour of the fluid friction clutch 1.

A further advantage consists in that, on account of the arrangement according to this disclosure of the pump element 14 in the storage chamber 10, only a small quantity of clutch fluid is required in comparison with the fluid friction clutches which are known from the prior art, since the pump element 14 removes the clutch fluid efficiently at the radially outer edge of the storage chamber 10. On account of the centrifugal forces which are present, the said region is always filled with clutch fluid, even if there is a small amount of clutch fluid in the storage chamber 10. Moreover, a low degree of filling of the storage chamber 10 contributes to lower friction losses, as a result of which the efficiency of the fluid friction clutch 1 is further increased. For the optionally provided division of the storage chamber 10 into a filling chamber 10A and a retaining chamber 10B, this effect can be utilized particularly. In this case, in the open (switched-off) state of the fluid friction clutch 1, the predominant part of the clutch fluid is conducted into the retaining chamber 10B and is held there, and only a very small quantity of clutch fluid is situated in the filling chamber 10A. As a result, the idling rotational speed of the fluid friction clutch 1 is kept low. This in turn increases the efficiency of the fluid friction clutch 1. Further details for the division of the storage chamber 10 into a filling chamber 10A and a retaining chamber 10B will be described further below.

Figure 2:
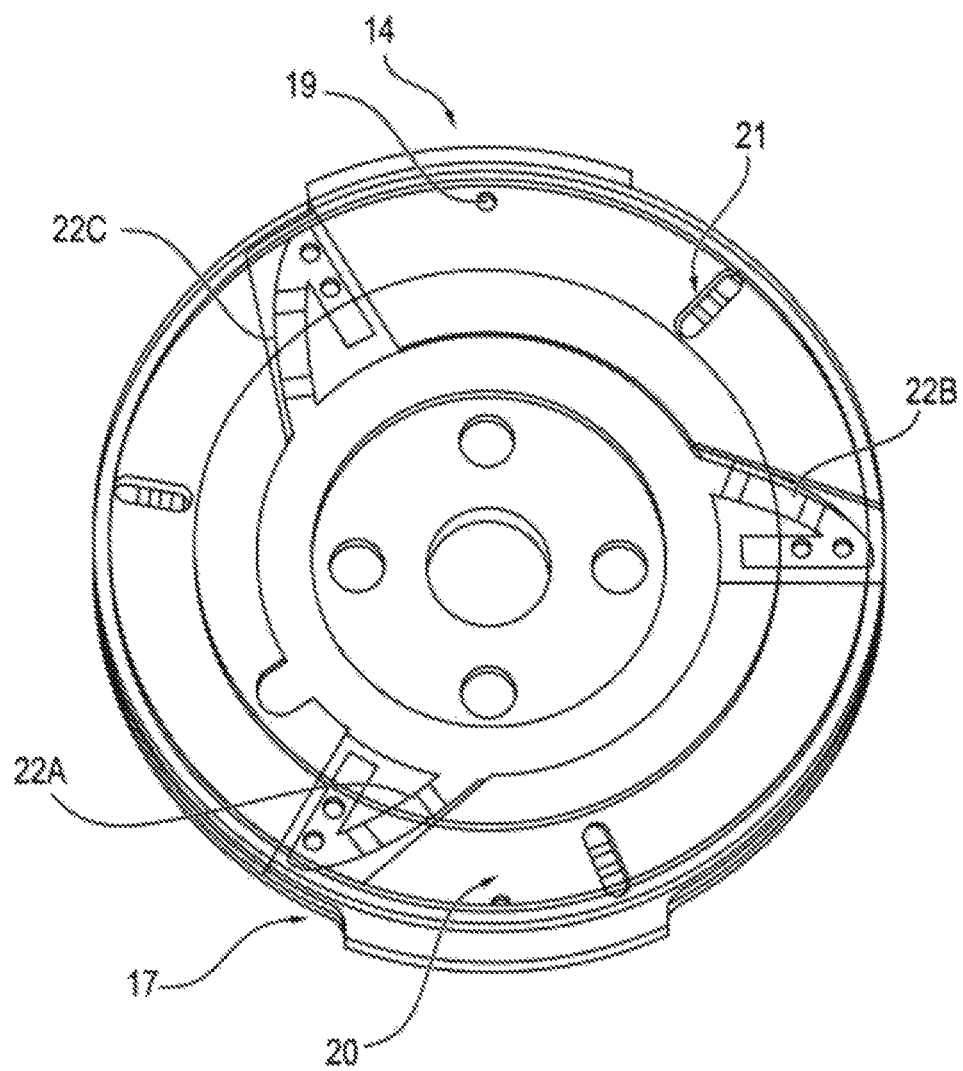
FIG. 2 shows a plan view of a clutch disc with components of a valve of the fluid friction clutch of FIG. 1B.
Figure 3:
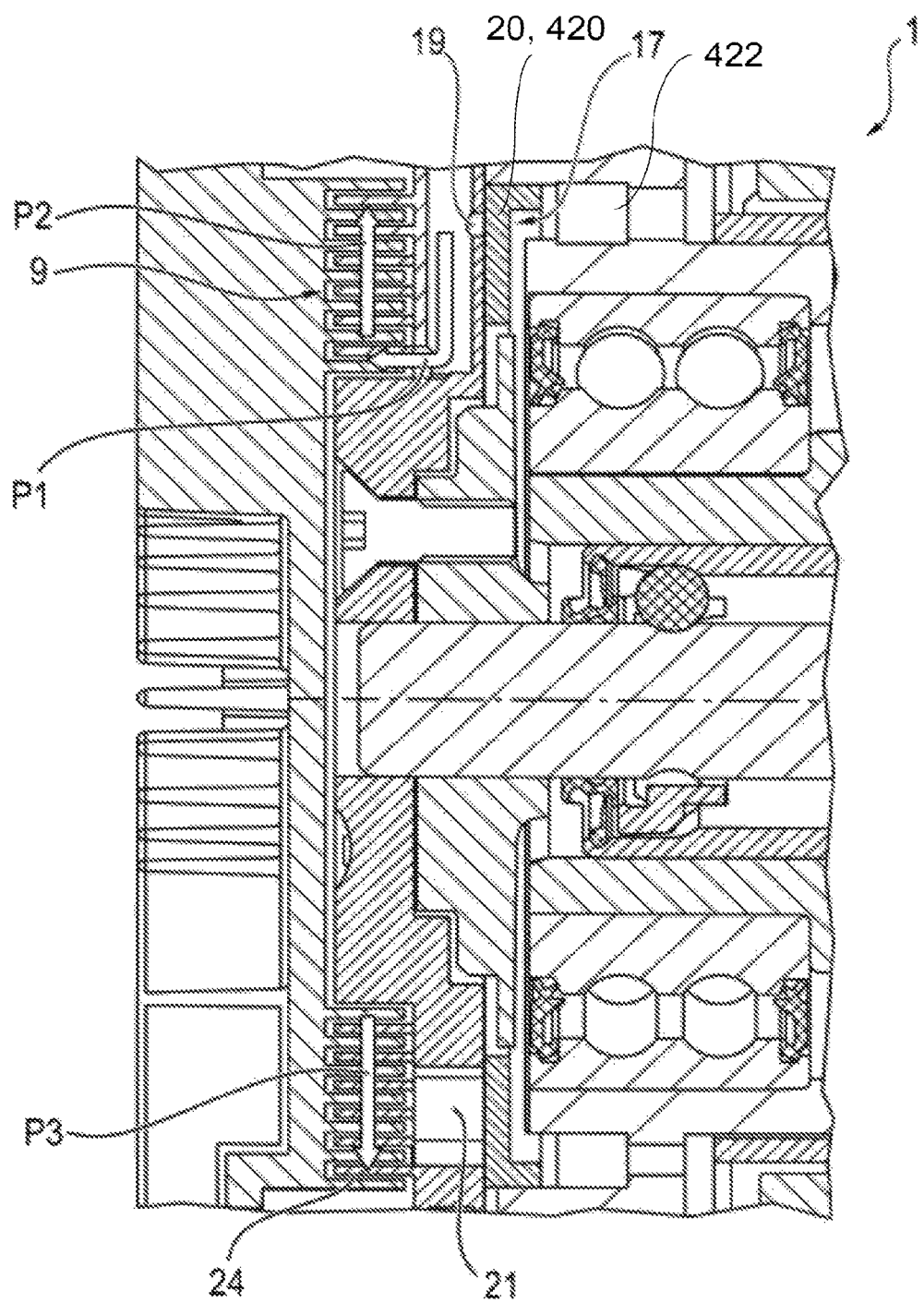
FIG. 3 shows an enlarged partial view of the fluid friction clutch of FIG. 1B in a closed state.

In further reference to FIG. 1 to FIG. 3, the fluid friction clutch 1 according to this disclosure can have, furthermore, a pressure relief device (also referred to herein as "pressure relief") for discharging clutch fluid from the feed duct 11A, 11B into the storage chamber 10. The pressure relief device is designed, depending on the operating state of the fluid friction clutch 1, to discharge clutch fluid in a targeted manner from the feed duct 11A, 11B into the storage chamber 10, before the clutch fluid reaches the working chamber 9. The pressure relief device makes a rapid dissipation of the delivery pressure of the clutch fluid in the direction of the working chamber 9 possible. Via this, in particular, the idling rotational speed of the fluid friction clutch 1 can be regulated. Moreover, via the pressure relief device in the case of a switched-off clutch (open clutch), the clutch fluid can be conducted directly from the feed duct 11A, 11B back into the storage chamber 10, without passing first of all into the working chamber 9. This leads to a higher efficiency of the fluid friction clutch, since fewer shear forces occur in the working chamber 9.

Figure 5:
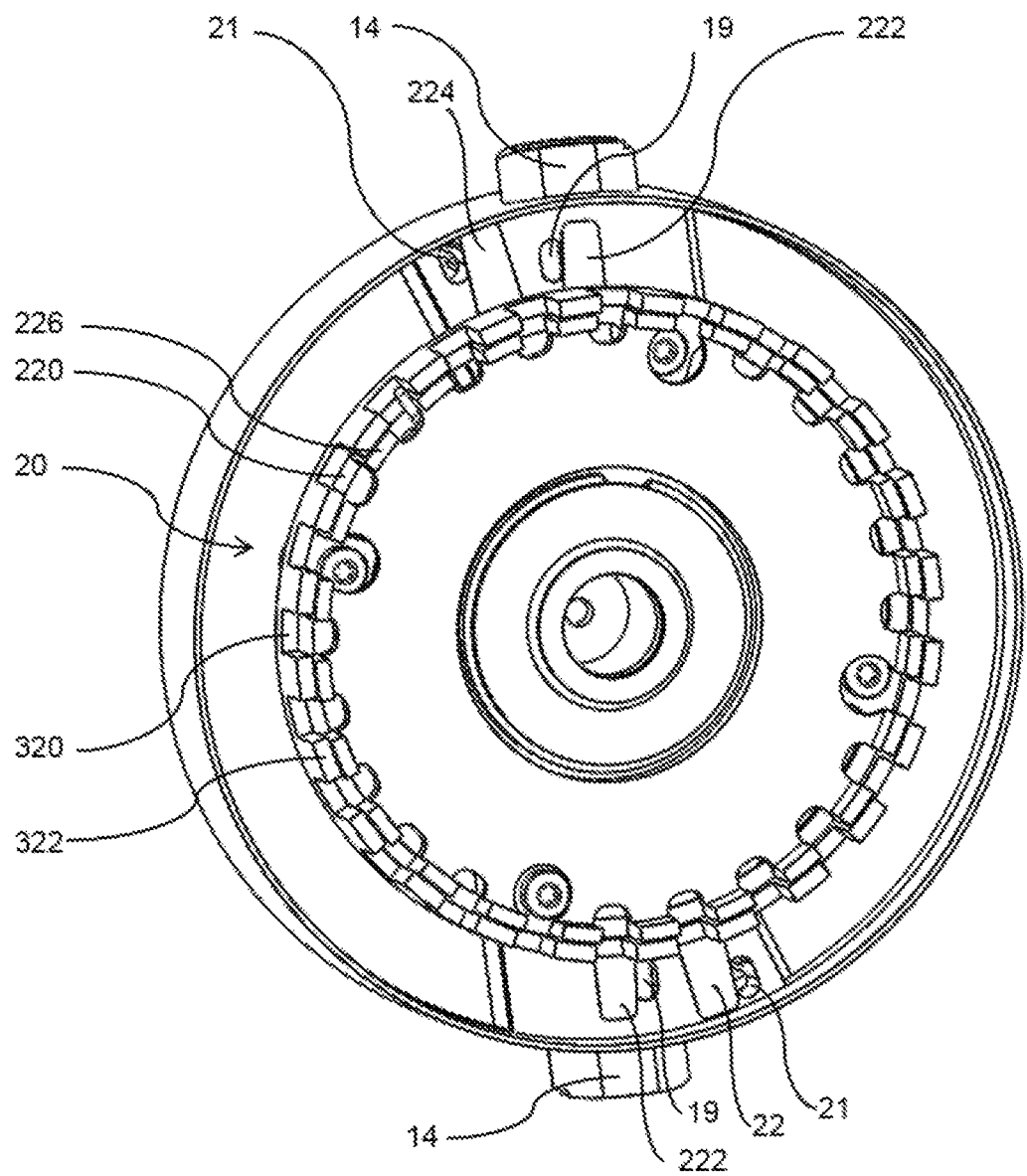
FIG. 5 shows a plan view of a clutch disc with components of a valve of the fluid friction clutch of FIG. 1A.

As can be seen in FIG. 1A to FIG. 1C, the pressure relief device comprises at least one pressure relief opening 19 in the clutch disc 4 in the region of the feed duct 11A, 11B, and a valve 17, the valve 17 having a closing device (also referred to herein as "closure") 20 for closing the pressure relief opening 19. In the region of one radial end of the working chamber 9, moreover, the clutch disc 4 has at least one outlet opening 21 (for example, two outlet openings 21 of this type are shown in FIG. 5). The closing device 20 is designed to also close the outlet opening 21. As has already been mentioned and is shown, for example, in FIG. 5 and FIG. 6, in each case two feed ducts 11A, 11B, two pressure relief openings 19 and two outlet openings 21 which are in each case arranged diametrically with respect to one another can be provided, for example. The closing device 20 is designed to close both pressure relief openings 19 and both outlet openings 21.

The valve 17 is designed to close the pressure relief openings 19 and the outlet openings 21 of the working chamber 9 by way of a single closing movement of the closing device 20 in order to fill the working chamber 9. In order to empty the working chamber 9, the valve 17 opens the pressure relief openings 19 and the outlet openings 21 of the working chamber 9 by way of a single opening movement of the closing device 20, which opening movement is in the opposite direction to the closing movement. The working chamber 9 can be emptied very rapidly as a result of the combination of outlet openings 21 and pressure relief openings 19 which can be opened and closed via a single valve 17. This leads to reduced losses and therefore to an increase in the efficiency of the fluid friction clutch 1. Moreover, the valve 17 for opening and closing both the pressure relief openings 19 and the outlet openings 21 provides a simple way of efficiently regulating the fluid friction clutch 1 without increasing the complexity of the fluid friction clutch, since a plurality of valves do not have to be provided.

The closing device 20 is prestressed into a closed switching position of the pressure relief openings 19 and the outlet openings 21. The prestress can be brought about by way of at least one restoring spring.

With reference to FIG. 1A and FIG. 5, one exemplary embodiment of the fluid friction clutch 1 according to this disclosure will be described, in the case of which the valve 17 is designed to rotate the closing device 20. That is to say, the closing and opening movement of the closing device 20 is a rotational movement, the closing device rotating about the axis R. A rotational movement of the closing device 20 has the advantage that the rotational movement is orthogonal with respect to a pressure force in the pressure relief openings 19 and the outlet openings 21 of the working chamber 9. Therefore, in this exemplary embodiment, the closing device 20 does not have to work counter to the said pressure force during closing.

In the case of this exemplary embodiment of the valve, the closing device 20 has a rotatably mounted closing ring 220 with closing lugs 222, 224 which extend radially to the outside from the closing ring 220 for closing the pressure relief openings 19 and the outlet openings 21 (see FIG. 5). Moreover, the valve 17 comprises an electromagnet 18 which is arranged in a receiving space 13 in the housing body 3 and is designed to rotate the closing ring 220 in order to open the pressure relief openings 19 and the outlet openings 21 (see FIG. 1A). That is to say, the valve 17 is operated by an electromagnetic actuator. For this purpose, the closing ring 220 which serves as an armature comprises a preferably ferromagnetic material and has axially extending teeth 226 along the radially outer circumference (see FIG. 5). Moreover, the valve comprises an actuating ring 320 which is installed fixedly on the clutch disc 4 (or, for example, two ring segments) as part of the electromagnet with a corresponding number of axially extending teeth 322 which are arranged radially within or radially outside the teeth 226 of the closing ring 220. If the electromagnet 18 is switched off, the restoring spring (for example, a torsion spring in this case) prestresses the closing ring 220 into a position, in which the teeth 226 of the closing ring 220 are arranged offset with respect to the teeth 322 of the actuating ring 320. In this position, the pressure relief openings 19 and the outlet openings 21 are closed. This is also the failsafe state of the fluid friction clutch 1, that is to say the state which the fluid friction clutch 1 assumes in order to avoid damage if, for example, a failure of the electrics and/or controller occurs and the valve 17 can no longer be actuated. In this state, the clutch is closed. That is to say, torque is transmitted from the housing 2, 3 to the shaft 6. If the electromagnet 18 is then energized, the teeth 226 of the closing ring 220 and the teeth 322 of the actuating ring 320 are oriented such that they lie above one another (see FIG. 5). As a result, the closing ring 220 and, with it, the closing lugs 222, 224 are rotated, with the result that the pressure relief openings 19 and the outlet openings 21 are open.

With reference to FIG. 1B, FIG. 2, FIG. 3 and FIG. 4, one alternative exemplary embodiment of the fluid friction clutch 1 according to this disclosure will be described, in the case of which the valve 17 is designed to move the closing device 20 in a translational manner in the axial direction. That is to say, the closing and opening movement of the closing device 20 is an axial movement parallel to the axis R. The closing device 20 then comprises an axially displaceable closing ring 420 (see FIG. 3), the closing ring 420 being designed to close both the pressure relief openings 19 and the outlet openings 21 in a closed position. Moreover, the valve 17 once again has an electromagnet 18 (see FIG. 1B) which is arranged in the receiving space 13 and is designed to displace the closing ring 420 axially in order to open the pressure relief openings 19 and the outlet openings 21. The valve 17 is therefore once again operated by an electromagnetic actuator. For this purpose, the closing ring 420 comprises a preferably ferromagnetic material and serves as an armature of the actuator. The poles of the actuator can be provided, for example, in the form of an actuating ring 422 which is installed fixedly in the housing 2, 3, the actuating ring 422 being arranged axially offset with respect to the closing ring 420 in the closed position (see FIG. 3). If the electromagnet 18 is switched off, the restoring spring (in this case, three axially acting springs 22A-22C, see FIG. 2) prestresses the closing ring 420 into a position, in which the closing ring 420 closes the pressure relief openings 19 and the outlet openings 21. This is once again the failsafe state of the fluid friction clutch 1. If the electromagnet 18 is then energized, an attracting force of the actuating ring 422 acts on the closing ring 420, with the result that the latter moves axially in the direction of the actuating ring 422. As a result, the pressure relief openings 19 and the outlet openings 21 are opened (see FIG. 4).

Figure 6:
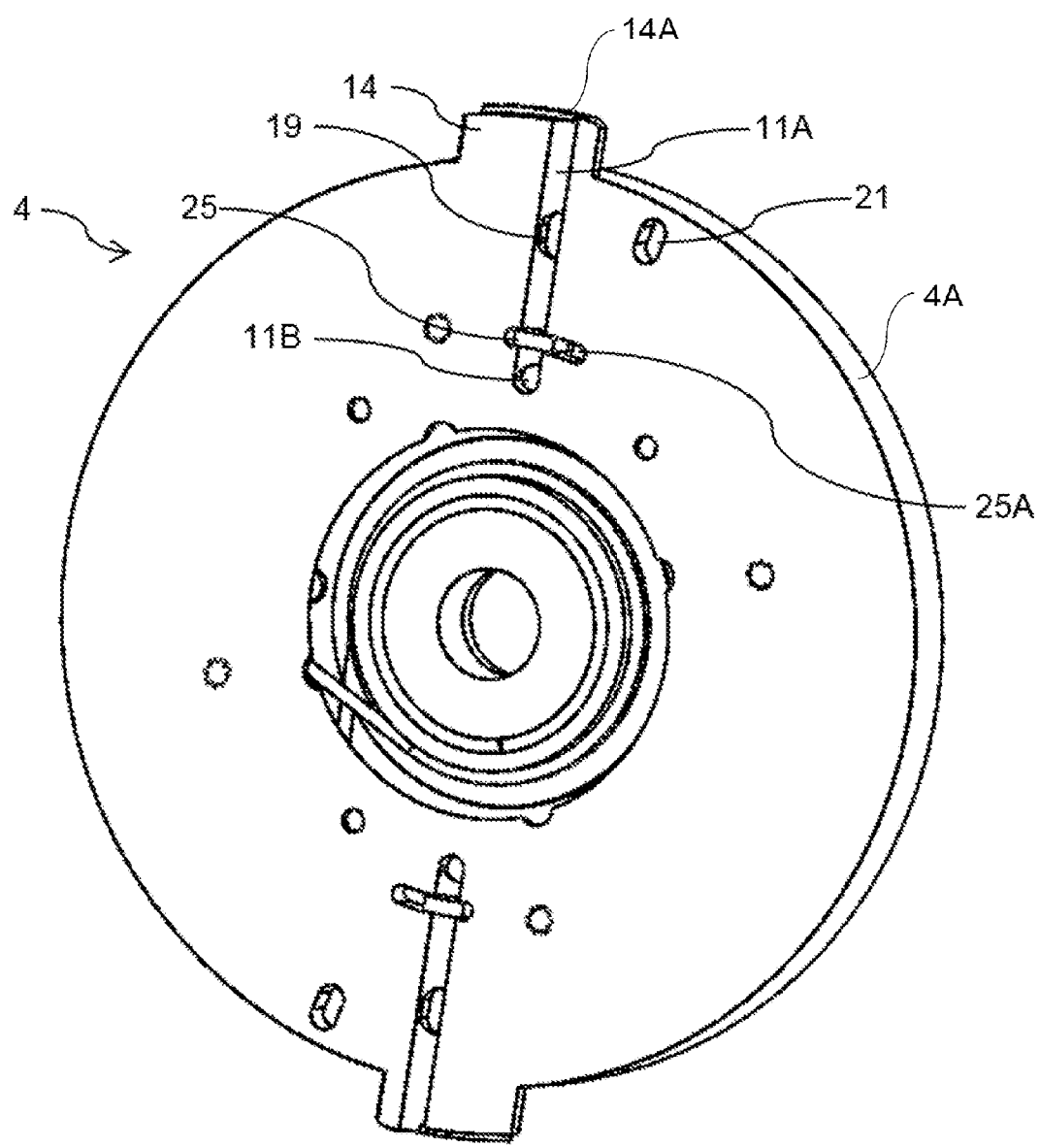
FIG. 6 shows a sectional view of the clutch disc with the fluid friction clutch of FIG. 1C.

The fluid friction clutch 1 according to this disclosure can have a further feature, namely at least one valve pin 25 which is designed to reduce the throughflow of clutch fluid through the feed duct 11A, 11B in a closed position of the fluid friction clutch 1, in order to minimize a feed of clutch fluid into the working space 19. The at least one valve pin 25 can be provided both in the exemplary embodiment of the valve 17 with a rotational movement (FIG. 1A) and for the embodiment of the valve 17 with an axial movement (FIG. 1B). With reference to FIG. 1C, one exemplary embodiment of the fluid friction clutch 1 according to this disclosure is shown which has a valve 17 in accordance with the exemplary embodiment from FIG. 1A and additionally comprises two valve pins 25 for the two feed ducts 11A, 11B. As can be gathered from FIG. 1C and FIG. 6, the valve pins 25 are arranged in the feed ducts 11A, 11B between the pressure relief openings 19 and the parts 11B of the feed ducts 11A, 11B which open into the working chamber 19. With reference to FIG. 6, if valve pins 25 of this type are provided, in each case one cut-out 25A is provided in the clutch disc 4 in the region of the feed ducts 11A, 11B, through which cut-outs 25A the valve pins 25 engage, in order to throttle or to close the feed ducts 11A, 11B in the closed position, with the result that (almost) no more clutch fluid is conveyed into the parts 11B of the feed ducts 11A, 11B and therefore into the adjoining working space 19. The valve pins 25 are preferably a part of the closing device 20 (the valve pins 25 can be, for example, an integral constituent part of the closing ring 220). The valve 17 is then designed to move the valve pins 25 into the closed position at the same time as the opening movement for opening the pressure relief openings 19 and the outlet openings 21. The same also applies to the closing movement for closing the pressure relief openings 19 and the outlet openings 21, by way of which closing movement the valve pins 25 are moved into an open position.

In exemplary embodiments of the fluid friction clutch 1 according to this disclosure, the storage chamber 10 can be divided into a filling chamber 10A and a retaining chamber 10B (see FIG. 1A, FIG. 1C). This division can in turn be provided for all exemplary embodiments of the fluid friction clutch 1 which have been described up to now herein. If a division into a filling chamber 10A and a retaining chamber 10B is provided, the pump element protrudes into the filling chamber part 10A of the storage chamber 10. In this case, moreover, the clutch fluid is discharged according to this disclosure through the pressure relief device from the feed duct 11A, 11B into the retaining chamber 10B. As a result of the division of the storage chamber 10 into a filling chamber 10A and a retaining chamber 10B, it is possible to set a targeted filling quantity distribution between the filling chamber 10A and the retaining chamber 10B. Here, the filling quantity in the filling chamber 10A is set to be lower than in the retaining chamber 10B, as a result of which the drag torque of the fluid friction clutch 1 in the open state of the fluid friction clutch 1 can be kept low, since the pump element 14 circulates in the small filling quantity in the filling chamber 10A. This reduces the idling rotational speed of the fluid friction clutch and therefore its losses (friction, drag torque), as a result of which the efficiency of the fluid friction clutch is increased and, via this, the fuel consumption is decreased.

Figure 7:
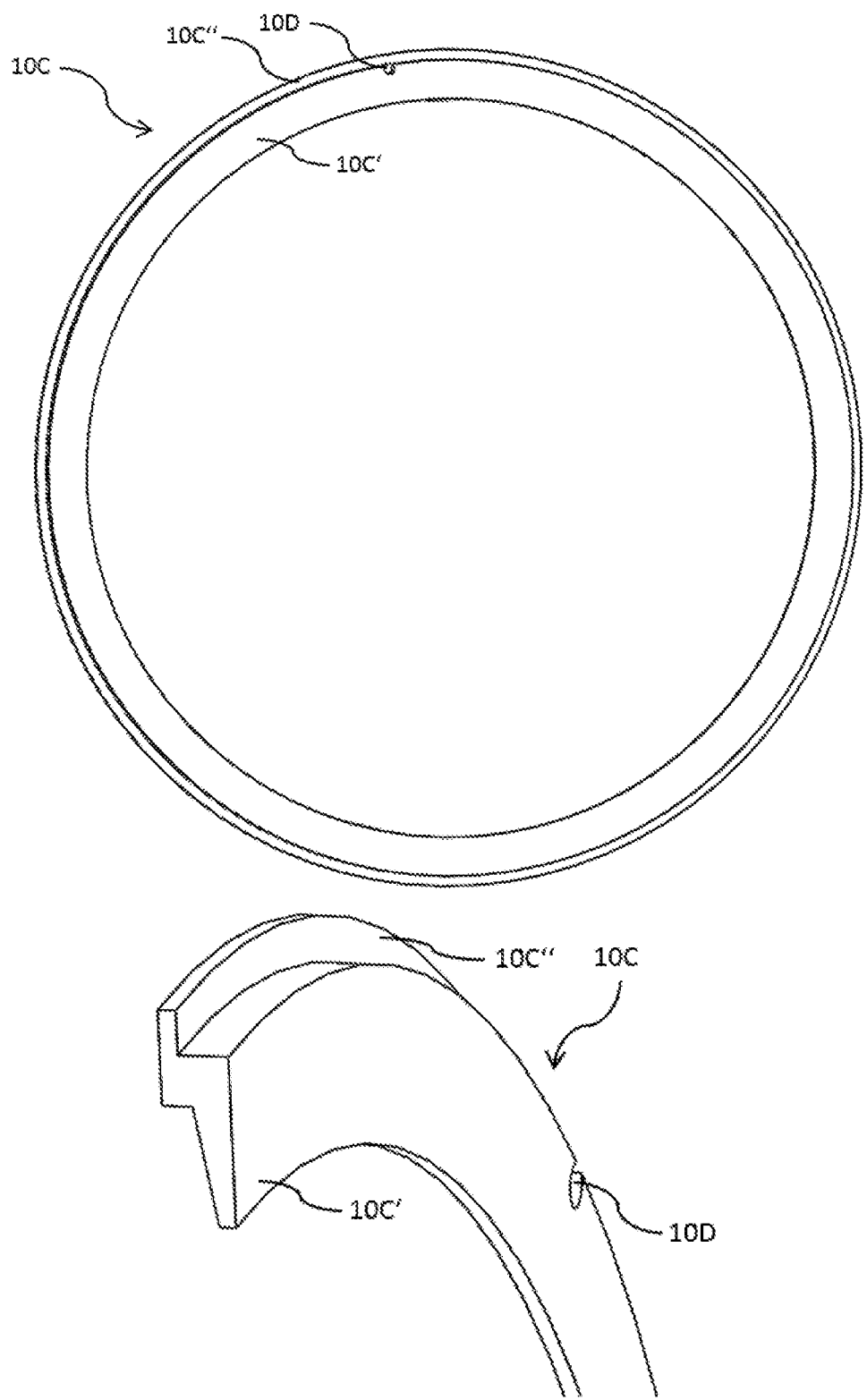
FIG. 7 shows a plan view and a perspective partially sectioned view of one exemplary embodiment of the retaining panel.

In the exemplary embodiments which are shown in FIG. 1A and FIG. 1C, in order to divide the storage chamber 10 into the filling chamber 10A and the retaining chamber 10B, an annular retaining panel 10C is provided which is arranged in the storage chamber 10. The retaining panel 10C has one or more openings 10D, for the throughflow of clutch fluid between the retaining chamber 10B and the filling chamber 10A. In the exemplary embodiment of the retaining panel 10C from FIG. 7, one opening 10D is provided which produces a throttle. The opening/openings 10D therefore regulates/regulate the throughflow rate of clutch fluid from the retaining chamber 10B into the filling chamber 10A and therefore the degree of filling in the filling chamber 10A. Via this, the idling rotational speed of the fluid friction clutch can in turn be set. The one or more openings 10D therefore represents/represent a flow resistance, via which the idling rotational speed of the clutch disc 4 can be set. With reference to FIG. 7, the retaining panel 10C can have a stepped cross-sectional profile.

The retaining panel 10C can have, for example, a radially inner ring region 10C' and a radially outer ring region 10C" which is clamped fixedly between the housing cover 2 and the housing body 3, as one example as to how the retaining panel 10C can be positioned and fixed in the housing 2, 3. The radially inner ring region 10C' of the retaining panel 10C extends radially to the inside, in order to divide the storage chamber 10 into the filling chamber 10A and the retaining chamber 10B. The stepped cross section can serve for simple centring of the retaining panel 10C. As an alternative, the retaining panel can also have only a simple ring shape without a stepped profile, which is clamped fixedly at its outer end between the housing cover 2 and the housing body 3. In this case, the centring can take place, for example, via a corresponding geometry on the housing cover 2 and/or on the housing body 3. An arrangement of this type has the advantages of simple assembly and division of the storage chamber 10 into the filling chamber 10A and the retaining chamber 10B.

For the operation of the fluid friction clutch 1, a total of between 15 cm$^3$ and 45 cm$^3$, in particular between 25 cm$^3$ and 35 cm$^3$ of clutch fluid can be provided which, depending on the operating state of the fluid friction clutch 1, is situated distributed in the working chamber 9, in the feed duct 11A, 11B, in the retaining chamber 10B and in the filling chamber 10A. The entire volume within the housing 2, 3, in which the clutch fluid can circulate, is at least 30 cm$^3$, in particular at least 50 cm$^3$. In the closed/switched-on state of the fluid friction clutch 1, a majority of the clutch fluid is situated in the working chamber 9, whereas, in the open/switched-off state of the fluid friction clutch 1, a majority of the clutch fluid is situated in the retaining chamber 10B. The volume of the retaining chamber 10B is therefore approximately from 10 cm$^3$ to 25 cm$^3$, in particular approximately from 15 cm$^3$ to 20 cm$^3$. In both states, the quantity of clutch fluid in the filling chamber 10A is kept low.

Figure 4:
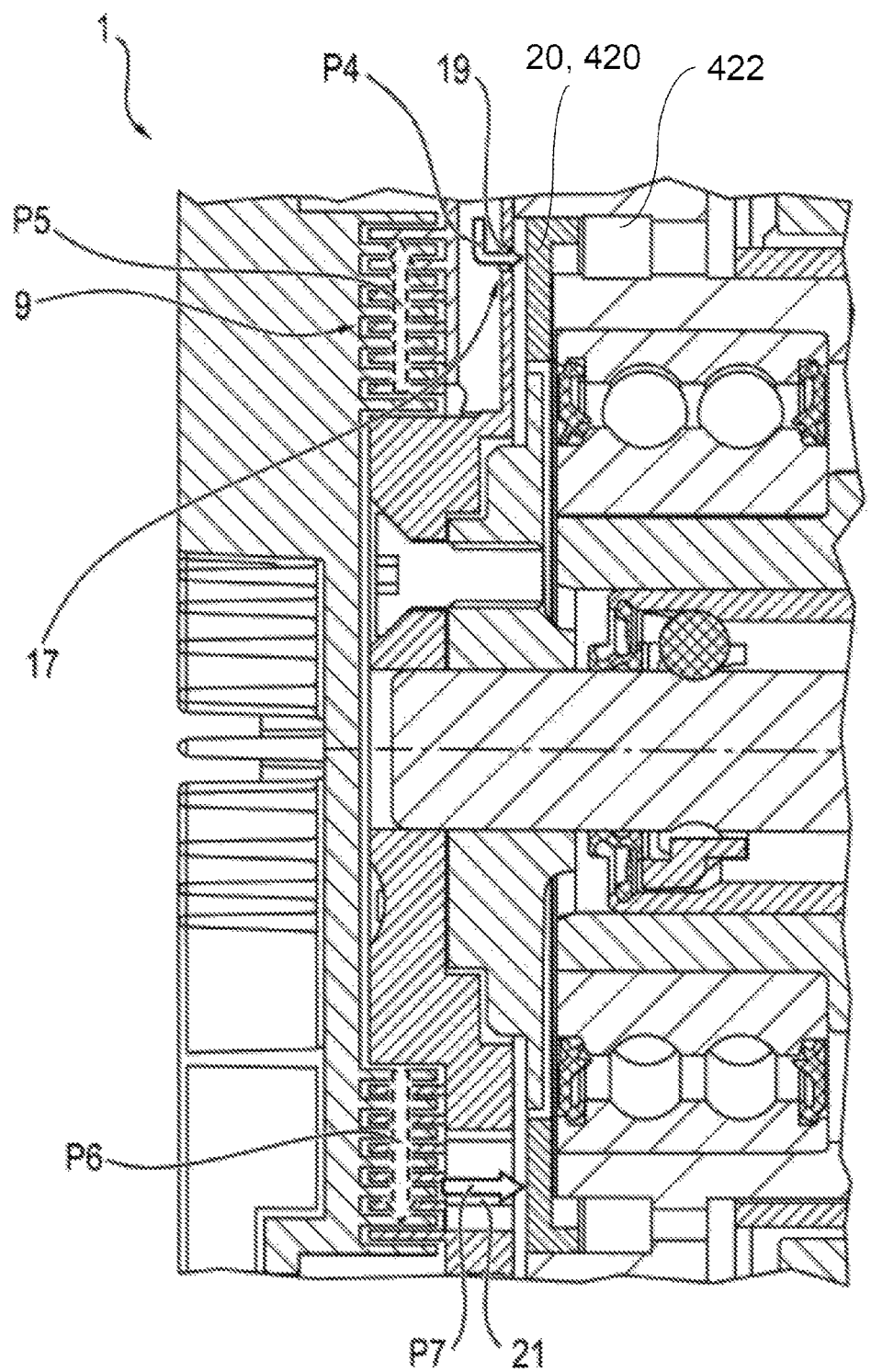
FIG. 4 shows an enlarged partial view of the fluid friction clutch of FIG. 1B in an open state.

The pressure build-up/dissipation and the movement of the clutch fluid during the corresponding switching states of the fluid friction clutch 1 will now be described by way of example using FIG. 3 and FIG. 4. FIG. 3 and FIG. 4 show an enlarged view of the exemplary embodiment from FIG. 1B.

FIG. 3 shows a closed position of the valve 17, in the case of which the closing device 20 or its closing ring 420 closes the pressure relief opening/openings 19 and the outlet opening/openings 21. The closing ring 420 is prestressed into this position by the restoring springs 22A to 22C. In this position, the fluid friction clutch 1 is switched on, that is to say torque is transmitted between the housing 2, 3 and the shaft 6. As has already been mentioned, this state is achieved by means of a single component in the form of the closing ring 420 and a single movement for both openings 19 and 21. Since the two openings 19 and 21 are closed and clutch fluid is conveyed via the pump element 14, pressure is built up in the feed duct 11A, 11B, with the result that the clutch fluid flows radially to the inside and is conducted into the working chamber 9, which is shown by way of the arrow P1. The clutch fluid flows radially to the outside in the working chamber 9 (see arrows P2 and P3), a last shear gap 24 of the working chamber 9 acting as a labyrinth seal and therefore the discharge of clutch fluid from the working space 9 being kept low in the said region (for example, the shear gap 24 can be configured as a very narrow gap of the working chamber 9). Therefore, a main part of the clutch fluid is held in the working chamber 9, as a result of which torque is transmitted on account of the shear forces which occur in the clutch fluid.

FIG. 4 shows an open position of the valve 17, in the case of which the closing ring 420 opens both the outlet openings 21 and the pressure relief openings 19. This corresponds to an open or switched-off state of the fluid friction clutch 1. As has already been mentioned, the opening of the outlet openings 21 and the pressure relief openings 19 is brought about by way of a single opening movement of the closing ring 420, which opening movement is induced by way of the magnet 18. The clutch fluid then flows through the outlet openings 21 and the pressure relief openings 19 back into the storage chamber 10 (which is shown by way of the arrows P4 to P7 in FIG. 4), with the result that the working chamber 9 is emptied and the idling rotational speed for the fluid friction clutch 1 is gradually set. If a divided storage chamber 10 is provided, the fluid friction is conducted from the working chamber 9 and the feed ducts 11A, 11B into the retaining chamber 10B, with the result that the degree of filling of the filling chamber remains low.

Furthermore, the fluid friction clutch 1 according to this disclosure can have a return pump system or a return delivery pump which, although it is not shown in the figures, serves to return clutch fluid from the working chamber 9 to the storage chamber 10. Reference is made in this regard to U.S. Publication No. 2015/0144452 A1, the disclosure of which is hereby incorporated herein by reference.

Figure 8:
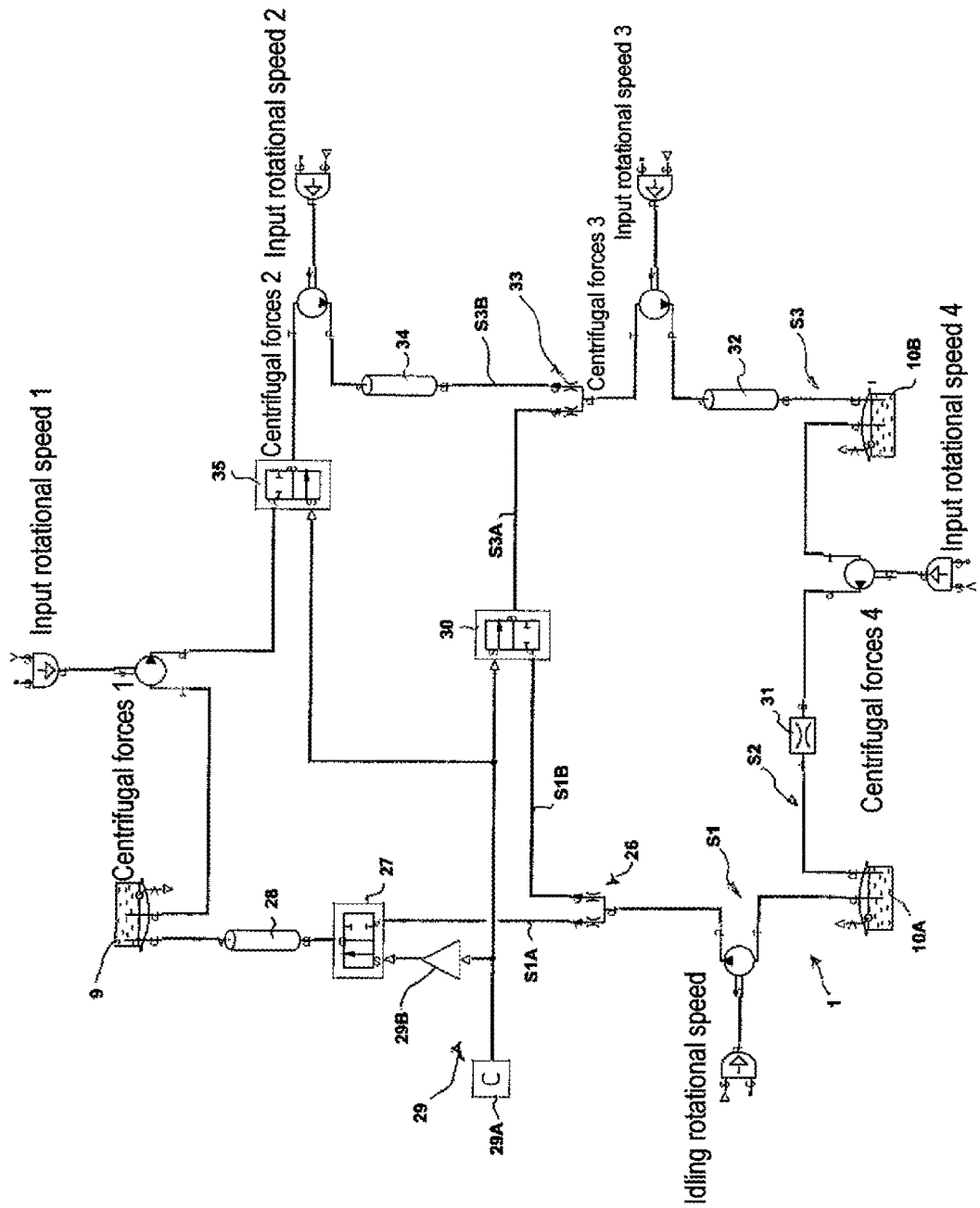
FIG. 8 shows a hydraulic circuit diagram of the fluid friction clutch according to this disclosure.

FIG. 8 illustrates a hydraulic diagram of the fluid friction clutch 1 according to this disclosure with a divided storage chamber 10. As FIG. 8 shows, the filling chamber 10A is connected hydraulically via a first flow path S1 to a first flow divider 26 which divides the first flow path S1 into a part path S1A and S1B. The flow path S1A leads to a working chamber inlet valve 27, and via a filling opening 28 to the working chamber 9.

A switching arrangement 29 is provided with a valve on-switch 29A and an on/off inverter 29B for switching the working chamber inlet valve 27.

The part path S1B leads to a pressure relief valve 30 which can likewise be actuated by the switching arrangement 29.

As FIG. 8 illustrates, furthermore, the filling chamber 10A is connected hydraulically via a second flow path S2 to the retaining chamber 10B, a throttle 31 which can be, for example, the opening 10D of the retaining panel 10C being arranged in the second flow path S2.

Furthermore, the retaining chamber 10B is connected to a third flow path S3 which leads via a second return line 32 to a second flow divider 33. The said flow divider 33 divides the third flow path S3 into a first part path S3A which runs to the pressure relief valve 30, and a second part path S3B. The said second part path S3B runs via a first return line 34 to a working chamber outlet valve 35 which can likewise be actuated by the switching arrangement 29, and ultimately to the working chamber 9.

The exemplary embodiments of the fluid friction clutch 1 according to this disclosure which are described herein have the advantage, moreover, that they are suitable for every type of auxiliary assembly. If, for example, the auxiliary assembly is a pump, the drive member of which is the pump impeller, the latter is mounted on the shaft 6 and therefore rotates at a secondary rotational speed. If the auxiliary assembly is a fan, the fan impeller is fixed on the housing 2, 3 which then in this case represents the component which runs at a secondary rotational speed.

In addition to the above written disclosure, it shall be understood that the drawings in FIGS. 1 to 8 supplement the disclosure and thus provide antecedent bases for features that are not explicit in the written description.

Although this disclosure has been described above and the invention is defined in the appended claims, it should be understood that, as an alternative, the invention can also be defined in accordance with the following embodiments:

Embodiment 1

Fluid friction clutch (1) having
a housing (2, 3);
a clutch disc (4) which is arranged at one end of a shaft (6) which is mounted within the housing (2, 3);
a working chamber (9) which is configured between the housing (2, 3) and the clutch disc (4);
a storage chamber (10) for clutch fluid; and at least one feed duct (11A, 11B) which leads from the storage chamber (10) to the working chamber (9);
characterized by a pressure relief device for discharging clutch fluid from the feed duct (11A, 11B) into the storage chamber (10).

Embodiment 2

Fluid friction clutch according to embodiment 1, characterized in that the pressure relief device comprises at least one pressure relief opening (19) in the clutch disc (4) in the region of the feed duct (11A, 11B), and a valve (17), the valve (17) having a closing device (20) for closing the pressure relief opening (19).

Embodiment 3

Fluid friction clutch according to embodiment 2, characterized in that, moreover, the clutch disc (4) has at least one outlet opening (21) in the region of one radial end of the working chamber (9), the closing device (20) being designed to also close the outlet opening (21).

Embodiment 4

Fluid friction clutch according to embodiment 3, characterized in that at least in each case two feed ducts (11A, 11B), two pressure relief openings (19) and two outlet openings (21) are provided which are arranged in each case diametrically with respect to one another, and in that the closing device (20) is designed to close both pressure relief openings (19) and both outlet openings (21).

Embodiment 5

Fluid friction clutch according to embodiment 3 or embodiment 4, characterized in that the valve (17) is designed to close the pressure relief opening/openings (19) and the outlet opening/openings (21) of the working chamber (9) by way of a single closing movement of the closing device (20) in order to fill the working chamber (9).

Embodiment 6

Fluid friction clutch according to embodiment 5, characterized in that the valve (17) is designed to open the pressure relief opening/openings (19) and the outlet opening/openings (21) of the working chamber (9) by way of a single opening movement of the closing device (20) which is in the opposite direction to the closing movement, in order to empty the working chamber (9).

Embodiment 7

Fluid friction clutch according to any one of embodiments 3 to 6, characterized in that the closing device (20) is prestressed into a closed switching position of the pressure relief opening/openings (19) and the outlet opening/openings (21).

Embodiment 8

Fluid friction clutch according to embodiment 7, characterized in that the prestress is brought about by way of at least one restoring spring, the restoring spring (22A to 22C), in particular, acting in the axial direction, or the restoring spring being a torsion spring.

Embodiment 9

Fluid friction clutch according to any one of embodiments 3 to 8, characterized in that the valve (17) is designed to rotate the closing device (20).

Embodiment 10

Fluid friction clutch according to embodiment 9, characterized in the closing device (20) has a rotatably mounted closing ring (220) with closing lugs (222, 224) which extend radially to the outside from the closing ring (220) for closing the pressure relief opening/openings (19) and the outlet opening/openings (21).

Embodiment 11

Fluid friction clutch according to embodiment 10, characterized in that, moreover, the valve (17) has an electromagnet (18) which is designed to rotate the closing ring (220) for opening the pressure relief opening/openings (19) and the outlet opening/openings (21).

Embodiment 12

Fluid friction clutch according to any one of embodiments 3 to 8, characterized in that the valve (17) is designed to move the closing device (20) in a translational manner in the axial direction.

Embodiment 13

Fluid friction clutch according to embodiment 12, characterized in the closing device (20) comprises an axially displaceable closing ring (420), the closing ring (420) being designed to close both the pressure relief opening/openings (19) and the outlet opening/openings (21) in a closed position.

Embodiment 14

Fluid friction clutch according to embodiment 13, characterized in that, moreover, the valve (17) has an electromagnet (18) which is designed to displace the closing ring (420) axially for opening the pressure relief opening/openings (19) and the outlet opening/openings (21).

Embodiment 15

Fluid friction clutch according to any one of the preceding embodiments, characterized in that, moreover, a valve pin (25) is provided which is designed to reduce the throughflow of clutch fluid through the feed duct (11A, 11B) in a closed position, in order to minimize a feed of clutch fluid into the working space (19).

Embodiment 16

Fluid friction clutch according to embodiment 15, characterized in that the valve pin (25) is part of the closing device (20).

Embodiment 17

Fluid friction clutch according to embodiment 16, characterized in that the valve (17) is designed to move the valve pin (25) into the closed position at the same time as the opening movement for opening the pressure relief opening (19) and the outlet opening (21).

Embodiment 18

Fluid friction clutch according to any one of the preceding embodiments, characterized in that the clutch disc (4) has, in a radially outer region, at least one pump element (14) which protrudes into the storage chamber (10), the pump element (14) defining a shear gap (12) with the housing (2, 3), with the result that, in the case of a rotation of the clutch disc (4) relative to the housing (2, 3), a pumping action is produced which conveys clutch fluid from the storage chamber (10) through the feed duct (11A, 11B) radially to the inside.

Embodiment 19

Fluid friction clutch according to any one of the preceding embodiments, characterized in that the storage chamber (10) is arranged radially on the outside, with the result that the storage chamber (10) is arranged outside an outer face (4A) of the clutch disc (4).

Embodiment 20

Fluid friction clutch according to any one of the preceding embodiments, characterized in that the storage chamber (10) is divided into a filling chamber (10A) and a retaining chamber (10B).

Embodiment 21

Fluid friction clutch according to embodiment 20, characterized by an annular retaining panel (10C) which is arranged in the storage chamber (10) and divides the storage chamber (10) into the filling chamber (10A) and the retaining chamber (10B).

Embodiment 22

Fluid friction clutch according to embodiment 21, characterized in that the retaining panel (10C) has one or more openings (10D), for the throughflow of clutch fluid between the retaining chamber (10B) and the filling chamber (10A).

Embodiment 23

Fluid friction clutch according to embodiment 22, characterized in that the one or more openings (10D) represents/represent a flow resistance, via which the idling rotational speed of the clutch disc (4) can be set.

Embodiment 24

Fluid friction clutch according to any one of the embodiments 21 to 23, characterized in that the retaining panel (10C) has a stepped cross-sectional profile.

Embodiment 25

Fluid friction clutch according to any one of embodiments 21 to 24, characterized in that the housing (2, 3) has a housing body (3) and a housing cover (2), and the retaining panel (10C) is clamped fixedly between the housing cover (2) and the housing body (3).

Embodiment 26

Fluid friction clutch (1) having
a housing (2, 3);
a clutch disc (4) which is arranged at one end (5) of a shaft (6) which is mounted within the housing (2, 3);
a working chamber (9) which is configured between the housing (2, 3) and the clutch disc (4);
a storage chamber (10) for clutch fluid; and
at least one feed duct (11A, 11B) which leads from the storage chamber (10) to the working chamber (9),
characterized in that the storage chamber (10) is divided into a filling chamber (10A) and a retaining chamber (10B).

Embodiment 27

Fluid friction clutch according to embodiment 26, characterized in that the storage chamber (10) is arranged radially on the outside, with the result that the storage chamber (10) is arranged outside an outer face (4A) of the clutch disc (4).

Embodiment 28

Fluid friction clutch according to embodiment 26 or embodiment 27, characterized by an annular retaining panel (10C) which is arranged in the storage chamber (10) and divides the storage chamber (10) into the filling chamber (10A) and the retaining chamber (10B).

Embodiment 29

Fluid friction clutch according to embodiment 28, characterized in that the retaining panel (10C) has one or more openings (10D), for the throughflow of clutch fluid between the filling chamber (10A) and the retaining chamber (10B).

Embodiment 30

Fluid friction clutch according to embodiment 29, characterized in that the one or more openings (10D) represents/represent a flow resistance, via which the idling rotational speed of the clutch disc (4) can be set.

Embodiment 31

Fluid friction clutch according to any one of embodiments 28 to 30, characterized in that the retaining panel (10C) has a stepped cross-sectional profile.

Embodiment 32

Fluid friction clutch according to any one of embodiments 28 to 31, characterized in that the housing (2, 3) has a housing body (3) and a housing cover (2), and the retaining panel (10C) is clamped fixedly between the housing cover (2) and the housing body (3).

Embodiment 33

Fluid friction clutch according to any one of embodiments 26 to 32, characterized by a pressure relief device for discharging clutch fluid from the feed duct (11A, 11B) into the storage chamber (10).

Embodiment 34

Fluid friction clutch according to embodiment 33, characterized in that the pressure relief device comprises at least one pressure relief opening (19) in the clutch disc (4) in the region of the feed duct (11A, 11B), and a valve (17), the valve (17) having a closing device (20) for closing the pressure relief opening (19).

Embodiment 35

Fluid friction clutch according to embodiment 34, characterized in that, moreover, the clutch disc (4) has at least one outlet opening (21) in the region of a radial end of the working chamber (9), the closing device (20) being designed to also close the outlet opening (21).

Embodiment 36

Fluid friction clutch according to embodiment 35, characterized in that at least in each case two feed ducts (11A, 11B), two pressure relief openings (19) and two outlet openings (21) are provided which are arranged in each case diametrically with respect to one another, and in that the closing device (20) is designed to close both pressure relief openings (19) and both outlet openings (21).

Embodiment 37

Fluid friction clutch according to embodiment 35 or embodiment 36, characterized in that the valve (17) is designed to close the pressure relief opening/openings (19) and the outlet opening/openings (21) of the working chamber (9) by way of a single closing movement of the closing device (20) in order to fill the working chamber (9).

Embodiment 38

Fluid friction clutch according to embodiment 37, characterized in that the valve (17) is designed to open the pressure relief opening/openings (19) and the outlet opening/openings (21) of the working chamber (9) by way of a single opening movement of the closing device (20) which is opposite to the closing movement, in order to empty the working chamber (9).

Embodiment 39

Fluid friction clutch according to any one of embodiments 35 to 38, characterized in that the closing device (20) is prestressed into a closed switching position of the pressure relief opening/openings (19) and the outlet opening/openings (21).

Embodiment 40

Fluid friction clutch according to embodiment 39, characterized in that the prestress is brought about by way of at least one restoring spring, the restoring spring (22A to 22C), in particular, acting in the axial direction, or the restoring spring being a torsion spring.

Embodiment 41

Fluid friction clutch according to any one of embodiments 35 to 39, characterized in that the valve (17) is designed to rotate the closing device (20).

Embodiment 42

Fluid friction clutch according to embodiment 41, characterized in the closing device (20) has a rotatably mounted closing ring (220) with closing lugs (222, 224) which extend from the closing ring (220) radially to the outside for closing the pressure relief opening/openings (19) and the outlet opening/openings (21).

Embodiment 43

Fluid friction clutch according to embodiment 42, characterized in that, moreover, the valve (17) has an electromagnet (18) which is designed to rotate the closing ring (220) for opening the pressure relief opening/openings (19) and the outlet opening/openings (21).

Embodiment 44

Fluid friction clutch according to any one of embodiments 35 to 40, characterized in that the valve (17) is designed to move the closing device (20) in a translational manner in the axial direction.

Embodiment 45

Fluid friction clutch according to embodiment 44, characterized in the closing device (20) comprises an axially displaceable closing ring (420), the closing ring (420) being designed to close both the pressure relief opening/openings (19) and the outlet opening/openings (21) in a closed position.

Embodiment 46

Fluid friction clutch according to embodiment 45, characterized in that, moreover, the valve (17) has an electromagnet (18) which is designed to displace the closing ring (420) axially for opening the pressure relief opening/openings (19) and the outlet opening/openings (21).

Embodiment 47

Fluid friction clutch according to any one of embodiments 33 to 46, characterized in that, moreover, a valve pin (25) is provided which is designed to reduce the throughflow of clutch fluid through the feed duct (11A, 11B) in a closed position, in order to minimize the feed of clutch fluid into the working space (19).

Embodiment 48

Fluid friction clutch according to embodiment 47, characterized in that the valve pin (25) is part of the closing device (20).

Embodiment 49

Fluid friction clutch according to embodiment 48, characterized in that the valve (17) is designed to move the valve pin (25) into the closed position at the same time as the opening movement for opening the pressure relief opening (19) and the outlet opening (21).

Embodiment 50

Fluid friction clutch according to any one of embodiments 26 to 49, characterized in that the clutch disc (4) has, in a radially outer region, at least one pump element (14) which protrudes into the storage chamber (10), the pump element (14) defining a shear gap (12) with the housing (2, 3), with the result that, in the case of a rotation of the clutch disc (4) relative to the housing (2, 3), a pumping action is produced which conveys clutch fluid from the storage chamber (10) through the feed duct (11A, 11B) radially to the inside.

Embodiment 51

Fluid friction clutch (1) having
a housing (2, 3);
a clutch disc (4) which is arranged at one end (5) of a shaft (6) which is mounted within the housing (2, 3);
a working chamber (9) which is configured between the housing (2, 3) and the clutch disc (4);
a storage chamber (10) for clutch fluid; and
at least one feed duct (11A, 11B) which leads from the storage chamber (10) to the working chamber (9);
characterized in that the clutch disc (4) has, in a radially outer region, at least one pump element (14) which protrudes into the storage chamber (10), the pump element (14) defining a shear gap (12) with the housing (2, 3), with the result that, in the case of a rotation of the clutch disc (4) relative to the housing (2, 3), a pumping action is produced which conveys clutch fluid from the storage chamber (10) through the feed duct (11A, 11B) radially to the inside.

Embodiment 52

Fluid friction clutch according to embodiment 51, characterized in that the shear gap 12 is between 50 μm and 2000 μm, in particular between 100 μm and 1000 μm, preferably between 200 μm and 800 μm in size.

Embodiment 53

Fluid friction clutch according to embodiment 51 or embodiment 52, characterized by the features of the characterizing part of any one of embodiments 19 to 25.

Embodiment 54

Fluid friction clutch according to any one of embodiments 51 to 53, characterized by a pressure relief device for discharging clutch fluid from the feed duct (11A, 11B) into the storage chamber (10).

Embodiment 55

Fluid friction clutch according to embodiment 54, characterized by the features of the characterizing part of any one of embodiments 2 to 17.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A fluid friction clutch, comprising:
   a housing;
   a shaft mounted within the housing;
   a clutch disc arranged at one end of the shaft;
   a working chamber between the housing and the clutch disc;
   a storage chamber configured to store clutch fluid;
   a feed duct leading from the storage chamber to the working chamber;
   a pressure relief configured for discharging clutch fluid from the feed duct into the storage chamber wherein the pressure relief comprises a pressure relief opening in the clutch disc in a region of the feed duct and a valve having a closing device for closing the relief opening;
   an outlet opening in the clutch disc located in a region of a radial end of the working chamber, the closing device configured to also close the outlet opening; and
   wherein the valve is configured to close the pressure relief opening and the outlet opening of the working chamber with a single closing movement of the closing device to thereby fill the working chamber.

2. The fluid friction clutch according to claim 1, wherein the valve is configured to rotate the closing device.

3. The fluid friction clutch according to claim 2, wherein the closing device has a rotatably mounted closing ring with closing lugs extending radially from the closing ring to the outside for closing the pressure relief opening and the outlet opening.

4. The fluid friction clutch according to claim 1, wherein the valve is configured to move the closing device in an axial direction.

5. The fluid friction clutch according to claim 4, wherein the closing device comprises an axially displaceable closing ring configured to close both the pressure relief opening and the outlet opening in a closed position.

6. The fluid friction clutch according to claim 1, further comprising a valve pin configured to reduce throughflow of clutch fluid through the feed duct in a closed position, whereby the feeding of clutch fluid into a working space is minimized.

7. The fluid friction clutch according to claim 6, wherein the valve pin is part of the closing device.

8. The fluid friction clutch according to claim 1, wherein the storage chamber is arranged radially on the outside of an outer face of the clutch disc, the storage chamber being divided into a filling chamber and a retaining chamber.

9. The fluid friction clutch according to claim 8, further comprising an annular retaining panel arranged in the storage chamber and dividing the storage chamber into the filling chamber and the retaining chamber.

10. The fluid friction clutch according to claim 9, wherein the retaining panel has a retaining panel opening configured for throughflow of clutch fluid between the retaining chamber and the filling chamber.

11. The fluid friction clutch according to claim 1, wherein the clutch disc has a pump element protruding into the storage chamber in a radially outer region, the pump element defining a shear gap with the housing, whereby rotation of the clutch disc relative to the housing produces a pumping action which conveys clutch fluid from the storage chamber through the feed duct radially to the inside.

12. A fluid friction clutch, comprising:
    a housing;
    a shaft mounted within the housing;
    a clutch disc arranged at one end of the shaft;
    a working chamber between the housing and the clutch disc;
    a storage chamber configured to store clutch fluid;
    a feed duct leading from the storage chamber to the working chamber;
    wherein the storage chamber is divided into a filling chamber and a retaining chamber and
    an annular retaining panel arranged in the storage chamber that divides the storage chamber into the filling chamber and the retaining chamber, wherein engagement of the retaining panel with a housing cover and a housing body centers the retaining panel with regard to a rotational axis of the shaft.

13. The fluid friction clutch according to claim 12, further comprising a pressure relief configured for discharging clutch fluid from the feed duct.

14. The fluid friction clutch according to claim 13, wherein the pressure relief comprises a pressure relief opening in the clutch disc in a region of the feed duct, and a valve having a closing device configured for closing the pressure relief opening.

15. The fluid friction clutch according to claim 12, further comprising an wherein the annular retaining panel has a stepped profile and engagement of the stepped profile with the housing cover and housing member centers the annular retaining panel with respect to the rotational axis of the shaft.

16. The fluid friction clutch according to claim 12, wherein the retaining panel has a retaining panel opening configured for throughflow of clutch fluid between the retaining chamber and the filling chamber.

17. The fluid friction clutch according to claim 12, wherein the clutch disc has a pump element protruding into the storage chamber in a radially outer region, the pump element defining a shear gap with the housing, whereby rotation of the clutch disc relative to the housing produces a pumping action which conveys clutch fluid from the storage chamber through the feed duct radially to the inside.

\* \* \* \* \*

UNITED STATES PATENT AND TRADEMARK OFFICE
CERTIFICATE OF CORRECTION

| | |
|---|---|
| PATENT NO. | : 10,837,500 B2 |
| APPLICATION NO. | : 16/135565 |
| DATED | : November 17, 2020 |
| INVENTOR(S) | : Thomas Buchholz and Wolfgang U. Sorg |

It is certified that error appears in the above-identified patent and that said Letters Patent is hereby corrected as shown below:

In the Claims

Column 20, Lines 52-53, Claim 15, the phrase "further comprising an wherein" should read --wherein--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*